United States Patent
Kostrzewa

[11] Patent Number: 5,622,085
[45] Date of Patent: Apr. 22, 1997

[54] RACK AND PINION STEERING GEAR WITH IMPROVED YOKE

[75] Inventor: Michael J. Kostrzewa, Roseville, Mich.

[73] Assignee: TRW Inc., Lyndhurst, Ohio

[21] Appl. No.: 515,513

[22] Filed: Aug. 15, 1995

[51] Int. Cl.$^6$ ............... B62D 5/22; F16H 19/04; F16C 27/02
[52] U.S. Cl. ............... 74/498; 74/422; 384/37; 384/42
[58] Field of Search ............... 74/422, 498; 384/26, 384/37, 42, 908, 909

[56] References Cited

U.S. PATENT DOCUMENTS

| | | | |
|---|---|---|---|
| 3,623,379 | 11/1971 | Bradshaw et al. | 74/498 |
| 4,400,991 | 8/1983 | Breitweg et al. | 74/498 |
| 4,531,426 | 7/1985 | Iijima | 74/498 |
| 4,593,578 | 6/1986 | Kobayashi et al. | 74/498 |
| 5,265,691 | 11/1993 | Konishi et al. | 74/498 X |

FOREIGN PATENT DOCUMENTS 873525  7/1961  United Kingdom ............... 384/908

*Primary Examiner*—Allan D. Herrmann
*Attorney, Agent, or Firm*—Tarolli, Sundheim, Covell, Tummino & Szabo

[57] ABSTRACT

A rack and pinion steering gear (10) includes a rack bar (22) and pinion gear (14) which are at least partially enclosed by a housing (12). Movement of the rack bar (22) relative to the housing (12) and pinion gear (14) is supported and guided by a yoke (30). The yoke (30) includes a metal base (38) and polymeric bearing material (40) molded over the metal base. The polymeric bearing material (40) has a bearing surface (42) which engages the rack bar (22). The metal base (38) is stamped as one piece from sheet material and includes a cylindrical side wall (50) and an end wall or panel (52).

26 Claims, 2 Drawing Sheets

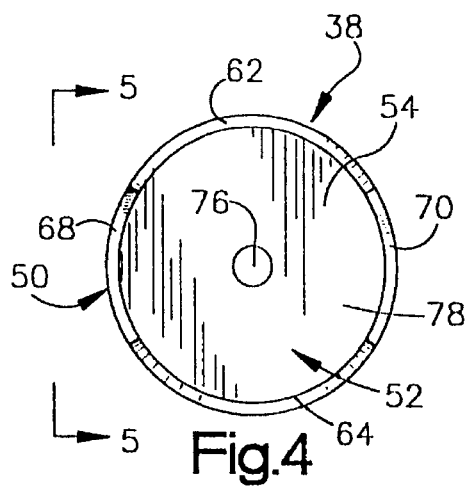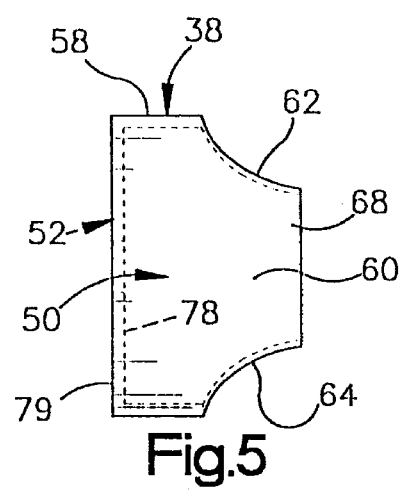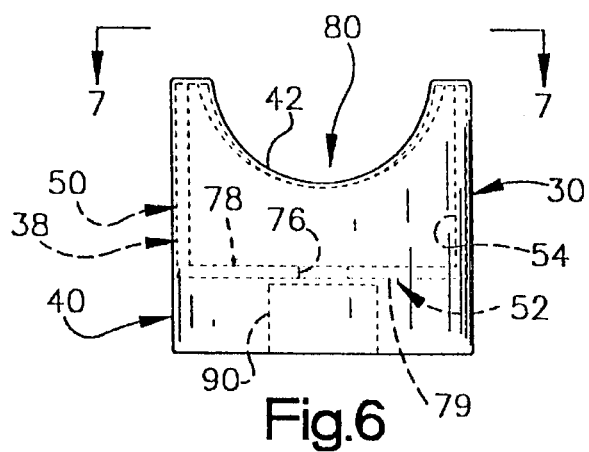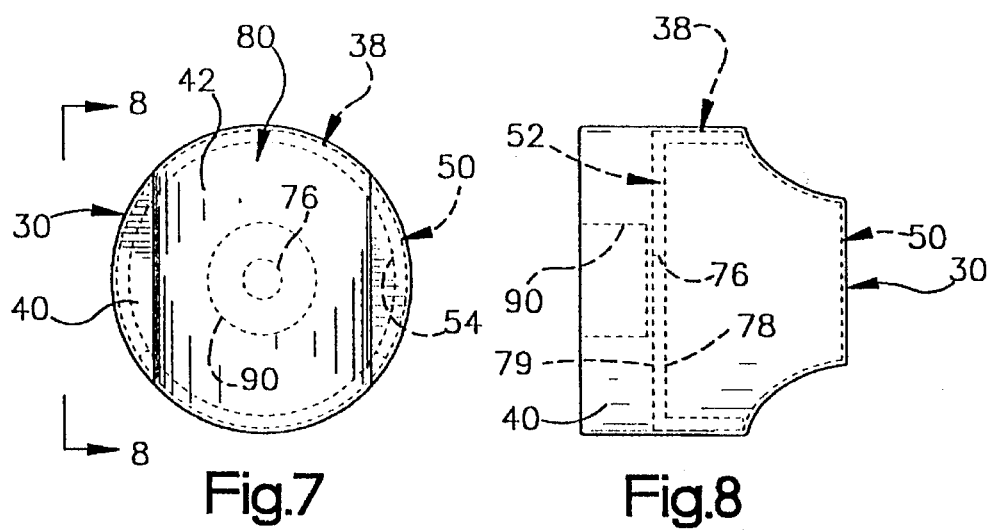

RACK AND PINION STEERING GEAR WITH IMPROVED YOKE

BACKGROUND OF THE INVENTION

The present invention relates to a rack and pinion steering gear and, more specifically, to a rack and pinion steering gear having a yoke which supports and guides movement of a rack bar relative to a pinion gear.

A known rack and pinion steering gear includes a pinion gear which is rotatably mounted in a housing and is connected with a steering wheel of a vehicle. A rack bar extends through the housing and has opposite end portions connected with steerable vehicle wheels. Gear teeth formed on the rack bar are disposed in meshing engagement with gear teeth on the pinion gear. A yoke is disposed in the housing to support and guide movement of the rack bar relative to the housing. Rack and pinion steering gear having this general construction are disclosed in U.S. Pat. Nos. 3,623,379; 4,811,813; and 5,357,845.

During operation of this known rack and pinion steering gear, the yoke may be subjected to relatively high loads. In addition, during operation of the rack and pinion steering gear, the yoke may be exposed to relatively high operating temperatures. The combination of relatively high operating loads and temperatures may result in deflection of the yoke and a failure of the yoke to provide proper support for the rack bar. A failure of the yoke to provide proper support for the rack bar can promote tooth wear on the pinion gear and/or the rack.

SUMMARY OF THE INVENTION

The present invention provides a rack and pinion steering gear having a pinion gear which is rotatably mounted in a housing. A rack bar is movable relative to the housing and has teeth disposed in meshing engagement with the pinion gear. An improved yoke is provided in the housing to support and guide movement of the rack bar relative to the pinion gear.

The yoke includes a metal base and polymeric bearing material. The polymeric bearing material may be molded against and disposed in engagement with the metal base. The polymeric bearing material has a bearing surface which is engaged by the rack bar.

The metal base may include a side wall and an end wall or panel which is connected with the side wall. The side wall and end wall cooperate to form a receptacle which is at least partially filled with the bearing material. Recesses are formed in opposite portions of the side wall. A bearing surface for the rack bar extends between the recesses in the side wall of the base. The side wall and end wall of the base may be integrally formed as one piece and enclosed by the polymeric bearing material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a top plan view, taken generally along the line 4—4 of FIG. 3, further illustrating the construction of the metal base;

FIG. 5 is a side elevational view, taken generally along the line 5—5 of FIG. 4, further illustrating the construction of the metal base;

FIG. 6 is a side elevational view, generally similar to FIG. 3, further illustrating the manner in which the metal base of the yoke is enclosed by polymeric bearing material;

FIG. 7 is a plan view, taken generally along the line 7—7 of FIG. 6; and

FIG. 8 is a side elevational view, taken generally along the line 8—8 of FIG. 7.

DESCRIPTION OF ONE SPECIFIC PREFERRED EMBODIMENT OF THE INVENTION

General Description

Figure 1:
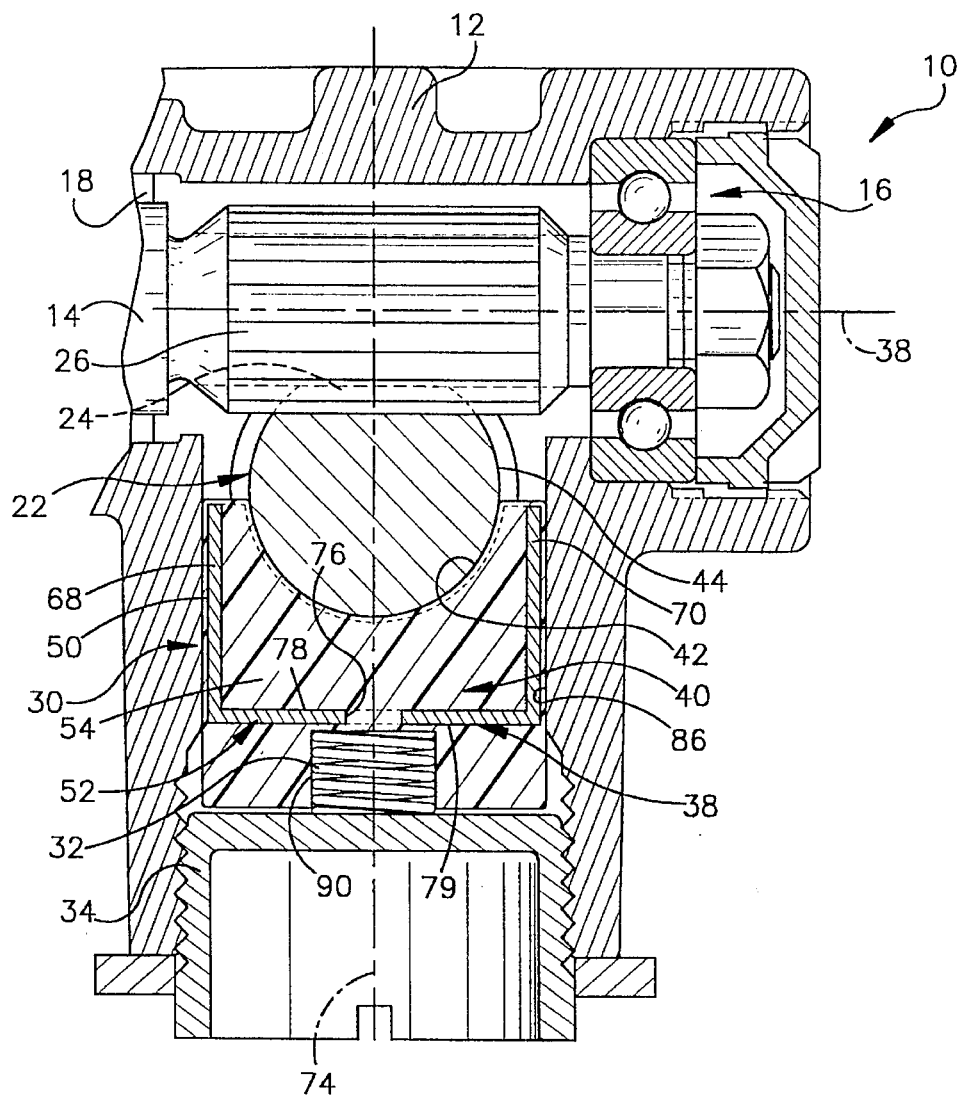
FIG. 1 is a sectional view of a rack and pinion steering gear having a yoke constructed in accordance with the present invention.

A rack and pinion steering gear 10 constructed in accordance with the present invention is illustrated in FIG. 1. The rack and pinion steering gear 10 includes a cast metal housing 12. A pinion gear 14 is rotatably supported in the housing by a bearing assembly 16 at one end of the pinion gear. A second bearing assembly 18 is provided in the housing to support the opposite end of the pinion gear 14. The pinion gear 14 is connected with a vehicle steering wheel.

A straight rack bar 22, having a generally cylindrical cross sectional configuration, extends through the housing 12 and is movable axially relative to the housing. The rack bar 22 has gear teeth 24 disposed in meshing engagement with gear teeth 26 on the pinion 14.

An improved yoke 30, constructed in accordance with the present invention, at least partially supports and guides movement of the rack bar 22 relative to the housing 12. A yoke spring 32 presses the yoke 30 against the rack bar 22. The yoke spring 32 is disposed between the yoke 30 and a metal plug 34 which is threaded into an opening formed in the housing 12.

Upon rotation of a vehicle steering wheel, the rack bar 22 moves axially relative to the housing 12 and the pinion gear 14 rotates about its central axis 38. Axial movement of the rack bar 22 relative to the housing 12 turns steerable vehicle wheels in a known manner. The axial movement of the rack bar 22 relative to the housing 12 is guided and supported by the yoke 30. The yoke 30 presses the rack gear teeth 24 against the pinion gear teeth 26 to maintain them in engagement during rotation of the pinion gear 14 and axial movement of the rack bar 22.

The rack and pinion steering gear 10 has a generally known construction and may be of either the manual or power assisted type. If the rack and pinion steering gear 10 is of the power assisted type, movement of the rack bar 22 and turning of the steering vehicle wheels may be assisted by either an electric motor or a fluid motor.

Yoke

In accordance with a feature of the present invention, the improved yoke 30 includes a metal base 38 and polymeric bearing material 40. The polymeric bearing material 40 has a smooth low friction bearing surface 42 which engages an outer side surface 44 on the rack bar 22. The polymeric bearing material 40 is molded around and is supported by the metal base 38. In the illustrated embodiment of the invention, the polymeric bearing material 40 completely encloses the metal base 38.

The metal base 38 (FIGS. 2, 3, 4 and 5) reinforces the polymeric bearing material 40 (FIGS. 6, 7 and 8). By reinforcing the polymeric bearing material, the metal base 38 enables the yoke 30 to resist relatively large rack and pinion gear tooth separation forces at relatively high operating temperatures. Since the metal base 38 enables the yoke 30 to resist relatively high loads at high temperatures, wear of the gear teeth 24 and 26 on the rack bar 22 and pinion gear 14 is minimized.

The metal base 38 is illustrated in FIGS. 2–5 and is integrally formed as one piece. The metal base 38 is preferably stamped as one piece from sheet steel. However, the metal base 38 could be formed in other ways if desired.

Yoke—Metal Base

The metal base 38 includes a side wall 50 (FIGS. 2–5). A transverse bottom wall or panel 52 is integrally formed as one piece with the side wall 50. However, if desired, the bottom wall 52 could be formed separately from the side wall 50 and welded or otherwise connected to the side wall. The side wall 50 and bottom wall 52 cooperate to form a receptacle 54 which is partially filled with the polymeric bearing material 40 (FIG. 1).

Figures 2, 3:
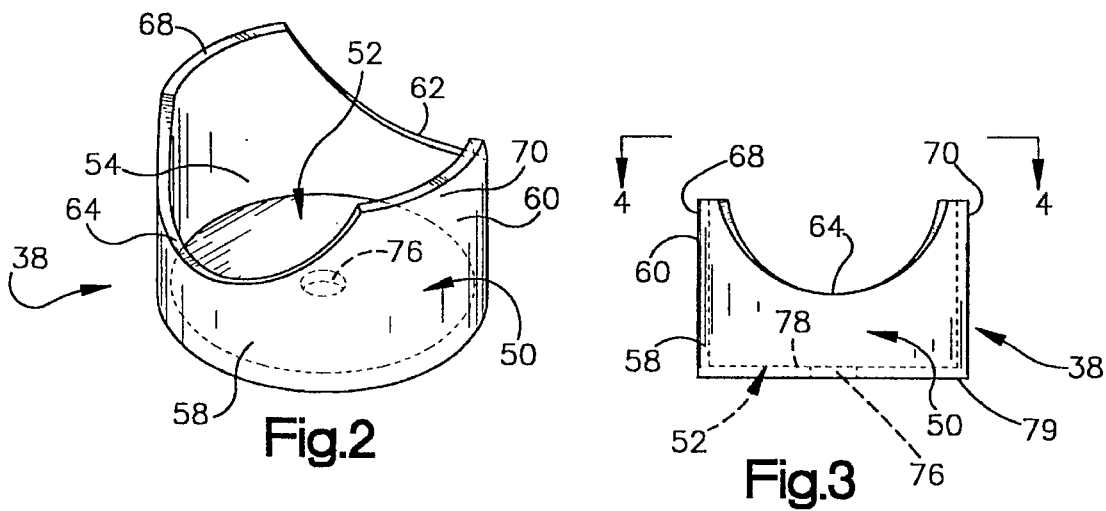
FIG. 2 is a pictorial illustration of a metal base of the yoke of FIG. 1.
FIG. 3 is a side elevational view of the metal base of FIG. 2.

In the embodiment of the metal base 38 illustrated in FIGS. 2–5, the metal side wall 50 has a cylindrical configuration. The side wall 50 has a circular lower end portion 58 (FIGS. 2 and 3) which is connected to the bottom wall or panel 52. The side wall 50 has a circular upper end portion 60 which defines a pair of recesses 62 and 64. The recesses 62 and 64 have a generally semi-circular configuration. The recesses 62 and 64 are disposed in diametrically opposite portions of the side wall 50 (FIGS. 2 and 4). The recesses 62 and 64 have coincident central axes which extend diametrically across the cylindrical side wall 50.

The recesses 62 and 64 have a generally semi-circular configuration. However, the recesses 62 and 64 have an arcuate extent which is slightly less than a complete semi-circle. Thus, the recesses 62 and 64 are slightly shallower than would be the case with true semi-circular recesses.

The recesses 62 and 64 have a configuration which corresponds to the configuration of the outer side surface 44 (FIG. 1) of the rack bar 22. The recesses 62 and 64 have a radius of curvature which is slightly larger than the radius of the generally cylindrical rack bar 22. The recesses 62 and 64 have a radius of curvature which is larger than the radius of curvature of the rack bar 22 to enable the rack bar to be received in the recesses when the side wall 50 is enclosed by the polymeric bearing material 40.

The side wall 50 could have a configuration which is different from the illustrated cylindrical configuration. Thus, if desired, the side wall 50 could have a polygonal configuration. For example, the side wall 50 could have a rectangular configuration with relatively long sides extending parallel to a linear longitudinal central axis of the rack bar 22 and short sides extending perpendicular to the longitudinal central axis of the rack bar. Semi-circular recesses, corresponding to the recesses 62 and 64, would be formed in the short sides of the rectangular side wall.

If desired, the cylindrical side wall 50 (FIGS. 2–5) could be constructed to have an axial extent such that recesses formed in diametrically opposite portions of the side wall are substantially shallower than the recesses 62 and 64. For example, the axial extent of the cylindrical side wall 50 could be such as to have the side wall terminate at a location below (as viewed in FIG. 1) the outer side surface 44 of the rack bar 22. However, it is preferred to form the side wall 50 with a pair of upstanding sections 68 and 70 (FIGS. 2 and 3) which extend along opposite sides of the rack bar 22 (FIG. 1). The upstanding sections 68 and 70 provide support for portions of the polymeric bearing material 40 which extends upward along opposite sides of the rack bar 22.

The bottom wall 52 has a flat circular configuration. The peripheral edge of the bottom wall 52 is connected with the lower end portion 58 (FIGS. 2, 3 and 5) of the side wall 50. The bottom wall 52 has a central axis 74 which is coincident with the central axis of the cylindrical side wall 50. The coincident central axes of the bottom wall 52 and side wall 50 extend perpendicular to and intersect the central axes of the rack bar 22 and pinion gear 14.

The bottom wall 52 has a circular central opening 76 (FIG. 4). Although the central opening 76 in the bottom wall 52 has a relatively small diameter compared to the overall diameter of the bottom wall, the central opening could have a substantially larger diameter. Thus, if desired, the bottom wall 52 could be formed as an annular flange which extends radially inward from the side wall 50. It is contemplated that the bottom wall 52 could be disposed at a location along the side wall 50 other than at the lower end portion 58 of the side wall.

The bottom wall has flat inner and outer side surfaces 78 and 79 which extend parallel to a longitudinal central axis of the rack bar 22 (FIG. 1). The flat inner side surface 78 of the bottom wall 52 cooperates with a cylindrical inner side surface of the side wall 50 to form the receptacle 54.

If desired, rather than providing a circular disk-shaped bottom wall 52, the bottom wall could be formed by a plurality of radially inward projecting tabs disposed at either the lower end of the side wall 50 or at a location offset upward (as viewed in FIGS. 2 and 3) from the lower end of the side wall. It is also contemplated that the bottom wall 52 could have a different configuration, for example square, and could project radially outward from the side wall 50 to facilitate connecting the yoke 30 with the housing 12.

Yoke—Bearing Material

The bottom wall 52 and side wall 50 are integrally formed as one piece. Thus, the bottom wall 52 and side wall 50 are stamped from a single piece of sheet metal (steel). However, the bottom wall 52 and side wall 50 could be formed separately and subsequently interconnected by the polymeric bearing material 40, welding or known connectors.

The polymeric bearing material 40 is molded as one piece and extends completely around and is supported by the metal base 38. The receptacle 54 (FIG. 2), formed by the side wall 50 and bottom wall 52 of the metal base 38, is partially filled by the polymeric bearing material 40 (FIGS. 6, 7 and 8). The upper portion (as viewed in FIG. 6) of the receptacle 54 is hollowed out to receive the rack bar 22. Thus, a linear groove 80 (FIGS. 6 and 7) extends diametrically across the metal base 38 and polymeric bearing material 40.

The groove 80 has an arcuate bottom which forms the bearing surface 42 and extends through the recesses 62 and 64 (FIGS. 2 and 4) formed in the metal base 38. The bearing surface 42 has a configuration which corresponds to the configuration of the outer side surface 44 of the rack bar 22 (FIG. 1). Thus, the bearing surface 42 (FIGS. 6 and 7) has a cross sectional configuration which is almost, but not quite, a complete semi-circle.

The bearing surface 42, formed by the bottom of the groove 80, has a linear longitudinal central axis which is coincident with the longitudinal central axis of the rack bar 22 (FIG. 1). The longitudinal central axis of the groove 80 extends parallel to the major side surfaces 76 and 78 on the bottom wall 52 and extends diametrically across the side wall 50. The longitudinal central axis of the groove 80 intersects and extends perpendicular to the central axis 74 (FIG. 1) of the side wall 50 and bottom wall 52 of the metal base 38. The bearing surface 42 is formed by the polymeric bearing material 40 and is disposed above (as viewed in FIGS. 1 and 6) the metal base 38.

It is contemplated that the bearing surface 42 formed by the bottom of the groove 80 may deviate from a true semi-circular configuration, in a manner which is generally similar to that disclosed in U.S. Pat. No. 3,623,379, issued Nov. 30, 1971 and entitled "Rack and Pinion Assembly". It is contemplated that one or more grooves for lubricant may be provided in the bearing surface 42.

The polymeric bearing material 40 is molded in the cylindrical receptacle 54 (FIGS. 6 and 7) formed by the side wall 50 and bottom wall 52 of the metal base 38. The receptacle 54 is filled with the polymeric bearing material to a level which is above the upper edges of the metal base 38. Therefore, when the lower side surface 44 of the rack bar 22 engages the groove 80, in the manner illustrated in FIG. 1, the rack bar slides along the polymeric bearing material 40 and does not engage the metal base 38.

The side wall 50 of the metal base 38 is completely enclosed by the polymeric bearing material 40 (FIGS. 6–8). Thus, a layer of polymeric bearing material is molded over the cylindrical outer side surface of the side wall 50 of the metal base 38. The layer of polymeric bearing material 40 molded over the cylindrical outer side surface of the metal base 38 engages a cylindrical inner side surface 86 (FIG. 1) of the housing 12. By having the layer of bearing material around the outer side surface of the side wall 50 of the metal base 38, metal-to-metal sliding engagement between the yoke 30 and housing 12 is avoided. This enables the yoke 30 to be easily pressed against the rack bar 22 by the yoke spring 32.

The polymeric bearing material 40 completely encloses the bottom wall 52 of the metal base 38. Thus, the bearing material 40 is also molded over the circular outer side surface of the bottom wall 52 of the metal base 38 (FIGS. 6 and 8). The layer of polymeric bearing material molded over the outer side surface of the bottom wall 52 is relatively thick, that is, has a relatively large axial extent. A cylindrical recess 90 is molded in the polymeric bearing material 40 across the lower side of bottom wall 52 to receive the yoke spring 32. The central axis of the cylindrical opening 90 is coincident with the central axis 74 of the metal base 38.

Although the bearing material 40 could be any known type of bearing material, it is preferred to use polymeric bearing material. Thus, the bearing material 40 is an acetal resin which is commercially available under the trademark "DELRIN". Of course other known polymeric materials could be used if desired.

From the above description of the invention, those skilled in the art will perceive improvements, changes and modifications. Such improvements, changes and modifications within the skill of the art are intended to be covered by the appended claims.

Having described the invention, the following is claimed:

1. A rack and pinion steering gear comprising:
   a housing:
   a pinion gear rotatably mounted in said housing;
   a rack bar movable relative to said housing, said rack bar having teeth in meshing engagement with said pinion gear; and
   a yoke in said housing for supporting and guiding movement of said rack bar relative to said pinion gear, said yoke including a metal base and polymeric bearing material adherently molded onto said metal base, said polymeric bearing material having a bearing surface which is engaged by said rack bar.

2. A rack and pinion steering gear as set forth in claim 1 wherein said metal base includes a cylindrical side wall, said polymeric bearing material being at least partially enclosed by said cylindrical side wall, said bearing surface having a longitudinal central axis which extends diametrically across said cylindrical side wall.

3. A rack and pinion steering gear as set forth in claim 2 wherein said metal base includes a transverse section which extends radially inward from said cylindrical side wall.

4. A rack and pinion steering gear as set forth in claim 3 wherein said cylindrical side wall incudes surface means for defining first and second recesses in said side wall, said bearing surface extends between said first and second recesses.

5. A rack and pinion steering gear as set forth in claim 1 wherein said metal base includes a panel having first and second major side surfaces which extend parallel to a longitudinal central axis of said rack bar, said polymeric bearing material being disposed in engagement with said first and second major side surfaces of said panel, said rack bar and said bearing surface having longitudinal central axes which extend parallel to said first and second major side surfaces of said panel.

6. A rack and pinion steering gear as set forth in claim 1 wherein said metal base includes a side wall which extends transversely to a longitudinal central axis of said rack bar and is enclosed by said polymeric bearing material.

7. A rack and pinion steering gear comprising:
   a housing:
   a pinion gear rotatably mounted in said housing;
   a rack bar movable relative to said housing, said rack bar having teeth in meshing engagement with said pinion gear; and
   a yoke in said housing for supporting and guiding movement of said rack bar relative to said pinion gear, said yoke including a metal base and polymeric bearing material molded against and disposed in engagement with said metal base, said polymeric bearing material having a bearing surface which is engaged by said rack bar;
   said metal base including a panel having a peripheral edge portion, said base having a side wall connected with said peripheral edge portion of said panel, said side wall extending away from said panel in a direction toward said rack bar and cooperating with said panel to form a receptacle in which a portion of said polymeric bearing material is disposed, said side wall having an outer side surface at least partially enclosed by said polymeric bearing material.

8. A rack and pinion steering gear as set forth in claim 7 wherein said panel has a circular configuration and said side wall has a cylindrical configuration.

9. A rack and pinion steering gear as set forth in claim 7 wherein said polymeric bearing material enclosing said outer side surface of said side wall is disposed in engagement with an inner side surface of said housing.

10. A rack and pinion steering gear comprising:
    a housing:
    a pinion gear rotatably mounted in said housing;
    a rack bar movable relative to said housing, said rack bar having teeth in meshing engagement with said pinion gear; and a yoke in said housing for supporting and guiding movement of said rack bar relative to said pinion gear, said yoke including a metal base and polymeric bearing material molded against and disposed in engagement with said metal base, said polymeric bearing material having a bearing surface which is engaged by said rack bar;

said metal base including a panel having a major side surface facing toward said rack bar and a side wall extending transversely to said major side surface of said panel and extending away form said panel in a direction toward said rack bar, said panel and said side wall cooperating to form a receptacle which is at least partially filled with said polymeric bearing material.

11. A rack and pinion steering gear as set forth in claim 10 wherein said side wall has a first end portion which is fixedly connected with said panel and a second end portion which at least partially defines first and second recesses in said side wall, said rack bar having a longitudinally extending outer side surface which is disposed in engagement with said bearing surface and extends through said first and second recesses in said side wall.

12. A rack and pinion steering gear as set forth in claim 10 wherein said polymeric bearing material encloses said side wall and is disposed in engagement with an inner surface of said housing.

13. A rack and pinion steering gear as set forth in claim 10 wherein said side wall has a cylindrical configuration and is integrally formed as one piece with said panel.

14. A yoke for supporting and guiding movement of a rack bar relative to a housing in a rack and pinion steering gear, said yoke comprising:

a metal end wall;

a metal side wall connected with said metal end wall and cooperating with said metal end wall to form a receptacle; and polymeric bearing material disposed within said receptacle, said polymeric bearing material including surface means defining a groove having an arcuate bottom surface which is engageable with the rack to support and guide movement of the rack relative to the housing.

15. A yoke as set forth in claim 14 wherein said metal side wall is integrally formed as one piece with said metal end wall.

16. A yoke as set forth in claim 15 wherein said polymeric bearing material encloses an outer side surface of said end wall.

17. A yoke as set forth in claim 14 wherein said side wall includes surface means for defining recesses in said side wall, said surface means defining a linear groove having a longitudinal central axis through said recesses in said side wall.

18. A yoke as set forth in claim 14 wherein said side wall has a cylindrical configuration and said end wall has a circular configuration.

19. A yoke as set forth in claim 14 wherein said polymeric bearing material at least partially encloses an outer side surface of said side wall.

20. A rack and pinion steering gear comprising:

a housing;

a pinion gear rotatably mounted in said housing;

a rack bar movable relative to said housing, said rack bar having teeth in meshing engagement with said pinion gear; and a yoke in said housing for supporting and guiding movement of said rack bar relative to said pinion gear, said yoke including a metal base and polymeric bearing material, said metal base including a side wall having inner and outer side surfaces which extend transversely to a longitudinal central axis of said rack bar, said inner and outer side surfaces of said side wall being at least partially enclosed by said polymeric bearing material, said polymeric bearing material having a bearing surface which is engaged by said rack bar and an outer side surface which engages said housing and extends transversely to said bearing surface.

21. A rack and pinion steering gear as set forth in claim 20 wherein said side wall includes surface means for defining first and second recesses in said side wall, said bearing surface extends through said first and second recesses in said side wall.

22. A rack and pinion steering gear as set forth in claim 20 wherein said metal base includes a panel having inner and outer side surfaces which extend parallel to a longitudinal central axis of said rack bar and are enclosed by said polymeric bearing material.

23. A rack and pinion steering gear as set forth in claim 20 wherein said metal base includes a panel which is integrally formed as one piece with said side wall, said panel and said side wall cooperating to form a receptacle which is at least partially filled with said polymeric bearing material.

24. A rack and pinion steering gear as set forth in claim 23 wherein said side wall has a cylindrical configuration and said panel has a circular configuration.

25. A rack and pinion steering gear as set forth in claim 20 wherein said polymeric bearing material is molded around and completely encloses said metal base.

26. A rack and pinion steering gear comprising:

a housing:

a pinion gear rotatably mounted in said housing;

a rack bar movable relative to said housing, said rack bar having teeth in meshing engagement with said pinion gear; and a yoke in said housing for supporting and guiding movement of said rack bar relative to said pinion gear, said yoke including a metal base and polymeric bearing material molded against and disposed in engagement with said metal base, said polymeric bearing material having a bearing surface which is engaged by said rack bar;

said metal base including a side wall, said side wall including surface means for defining first and second recesses in said side wall, said rack bar having a longitudinally extending outer side surface disposed in engagement with said bearing surface and extending through said first and second recesses in said side wall.

* * * * *